United States Patent Office 3,013,010
Patented Dec. 12, 1961

3,013,010
RESOLUTION OF SAPOGENIN MIXTURES AND INTERMEDIATE PRODUCTS
Luis Ernesto Miramontes Cardenas, Mexico City, Mexico, assignor to G. D. Searle & Co., Chicago, Ill., a corporation of Illinois
No Drawing. Filed Feb. 25, 1957, Ser. No. 641,852
2 Claims. (Cl. 260—239.55)

This invention relates to resolution of a mixture of sapogenins containing oxo-sapogenins such as hecogenin by reaction of the oxo-sapogenins in the mixture with a hydrazine and separating the components of the mixture by differential solubility in organic solvents; and to the novel hydrazone and azine derivatives of hecogenin.

More specifically, the invention is directed to separation of hecogenin from a complex mixture of sapogenins as produced by hydrolysis of naturally occurring saponins, such mixture typically comprising hecogenin admixed with non-oxo-sapogenins of the character of tigogenin, chysogenin, sarsasapogenin, diosgenin and the like.

Such complex mixtures of sapogenins which contain oxo compounds, primarily hecogenin, have been resolved in the past by application of various solvents to effect a selective solubilization and fractional crystallization from the crude mixture of sagogenins, but such prior processes were most laborious requiring numerous extractions and recrystallizations to effect separations of products often of inadequate purity, usually with substantial waste of valuable sapogenin materials.

The present method in broadest aspect includes as a first or primary step, the treatment of the sapogenin mixture to convert the oxo-compounds to hydrazone derivatives such as hydrazone compounds of hecogenin. Such derivatives have a marked differential solubility in polar solvents such as lower alkanols, as compared to useful solvents for non-oxo compound of less polar character such as lower esters and ethers.

In another aspect of the invention I have found that formation of novel oily hydrazone derivatives of hecogenin in the sagogenin mixture may be produced by reaction of the mixture with a specific group of hydrazines comprising a compound having the formula R—NH—NH$_2$, wherein R is a member of the group consisting of hydrogen, lower alkyl having from one to six carbon atoms and a thiocarbazino radical

These hydrazone compounds comprise an oily liquid which is superior as intermediate for differential solvent separation from the other unreacted sapogenins in which they occur. Since they are oily liquids and the extraction effect of the differential solvent thereon is more complete, sharper separations and therefore purer extract products are obtained. That is, in contrast to crystalline solids having impurities more firmly embedded therein, the oily liquid has a physical structure wherein extraction allows purer separation.

The oily hydrazone intermediates of this invention are new compounds having the Formula I. They are convertible to crystallizable azines of Formula II.

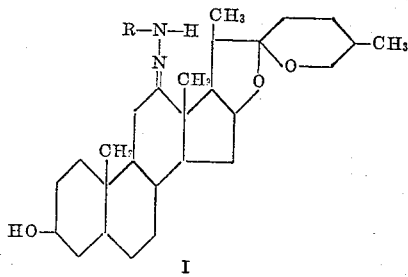

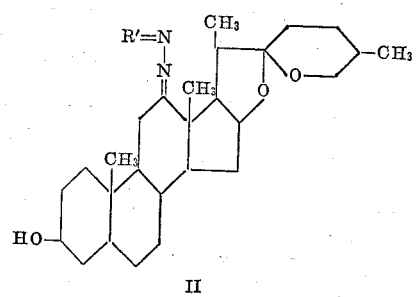

where R is H the hydrazone can be converted with a lower ketone such as acetone to acetone azine hecogenin. Thus R' can represent the residue of a lower alkyl ($C_1$–$C_6$) carbonyl compound, e.g. formaldehyde, acetone, methyl-isobutyl ketone. The hydrazone can also be converted to the azine of hecogenin by further treatment with hecogenin or by heating the hydrazone. Thus R' can also represent the residue of a hecogenin molecule.

The hydrazone derivative is formed by heating, preferably refluxing the sapogenin mixture containing an oxo group, such as hecogenin, with a hydrazine in alkaline solution in a polar solvent, i.e., a lower alkanol having 1 to 4 carbon atoms for an extended period, of about 5 to 48 hours, preferably 18 to 36 hours, the excess hydrazine per se usually providing the desired alkalinity. Usual hydrazines, however, such as phenyl hydrazine or phenyl semicarbazine, directly form in the alkanol solution crystallizable solid phenyl hydrazone and phenyl semicarbazone. However, where a hydrazine having the formula R—NH—NH$_2$, where R is defined as above, is used as the hydrazine in this reaction, the compound formed, is an oily hydrazone compound having the structure of Formula I.

Thus, according to this invention, the sapogenin mixture containing oxo compounds such as hecogenin are reacted with a hydrazine to form a compound of Formula I whereby the mixture may be separated by further purification.

The solid azine of Formula II, of course, is in itself readily isolated as a solid and may be purified by washing with solvents; hence, after utilization of the hydrazone compound in the separating process it is usually desirable to ultimately convert the hydrazone compound of Formula I to the azine compound of Formula II which may be effected by any of four alternate procedures.

(a) The hydrazone compound of Formula I may be heated in organic acids like formic or acetic acid, alone or mixed with ethanol or in a solution of HCl in ethanol (pH 5–6) under refluxing conditions for a non-critical short period ranging from about 3 minutes to an hour, preferably 10 to 30 minutes and then dried by evaporation of the acid to obtain the corresponding azine of Formula II (R'=N—N=R', where R' represents the hecogenin radical).

(b) The hydrazone solution may be evaporated to dryness in a vacuum and heated for a brief period of 3 minutes to one hour at a temperature of 180 to 220° C., preferably about 210° C., for 20 to 40 minutes.

(c) The dry oily hydrazone compound of Formula I may be refluxed in a lower 1–4 carbon atom alkanol with a small quantity, about 5 to 25% based on the weight of the hydrazone compound, of pyridine hydrochloride for a period of 10 minutes to one hour, preferably 20 to 45 minutes. Thereafter, the acid solution is heated with alkali sufficient to render the solution slightly alkaline until abundant crystallization occurs. The solid azine formed may, of course, be further purified by crystallization from chloroform-alcohol mixtures or tetrahydrofuran.

(d) The hydrazone may be refluxed in solvents of high boiling point like tetralin or the monoethyl ether of ethylene glycol for a period of 10 minutes to one hour.

The lower alkanol solvent of 1 to 4 carbon atoms in which the hydrazone compound is formed may be methanol, ethanol, isopropanol, tertiary butanol, ethylene glycol monoethyl ether, and the like, of which ethanol is preferred.

The pure hecogenin may be recovered from the pure hydrazone compound or from the azine by hydrolysis with acid, heating a solution thereof in a lower alkanol alone or admixed with a less polar solvent such as chloroform for 15 minutes to one hour at reflux temperature, at a pH of 1 or 2.

When purifying the crude mixture of sapogenins according to the present invention, oxo sapogenins in the mixture of crude sapogenins is best converted to a hydrazone compound by refluxing in the lower alkanol with an equivalent quantity of a hydrazine, using a hydrazine of the formula R—NH—NH$_2$ where R is as defined above to convert the oxo compounds, primarily hecogenin to an oily liquid hydrazone derivative. The reaction mixture, for separation of its components, may be treated as follows.

Following initial formation of hydrazone compounds in lower alkanol solution as a reaction mixture with other unreacted sapogenins, the solution may be merely concentrated by removal of from one-third to two-thirds of the alcoholic solvent by evaporation, whereupon the unreacted non oxo-sapogenins precipitate, usually with crystallization from the alcoholic solution and may be separated in that manner, followed by further purification of the filtered crystals of tigogenin and the like; and with further purification of the residual alcoholic solution of the hecogenin hydrazone compound.

Alternatively the unreacted non oxo sapogenins may be precipitated while leaving the hydrazone compound in solution, by addition to the alkanolic solution of a controlled quantity of water ranging from about 5 to 30% to reduce the solubility of the alcohol for the non-oxo compounds and the separated solutions and solids are then separately worked up into pure products.

Still another modification may be used in order to recover the unreacted hydrazine. The entire reaction mixture may be evaporated to dryness in vacuo whereby any excess unreacted hydrazine may be immediately removed by volatilization together with the alkanol solvent, both of which may be recovered from the condensed vapors. Thereafter the dry reaction mixture comprising the oily hydrazone derivative together with unreacted non oxo-sapogenins is then solvent extracted with the lower alkanol of 1-4 carbon atoms. These alkanols when applied to the residue form a solution of the hydrazone derivative leaving the non oxo-sapogenin in the residue.

The hydrazone compound extract dissolved in the alcoholic solvent may be hydrolyzed to directly produce the free hecogenin by acidifying to a pH of about one and refluxing for a short period of 20 to 45 minutes and the pure hecogenin recovered by crystallization from the hydrolytic solution, preferably neutralizing the acid hydrolytic product, and heating to crystallization and washing the crystals with water, and, if desired, again recrystallizing from a lower alkanol.

Frequently it is preferable to further purify the hydrazone. This is done by converting the hydrazone to the azine derivative. Thus the alcoholic solution remaining after removal of the non oxo sapogenin residue may have its pH adjusted to 6 by addition of formic, acetic acid or HCl to convert the hydrazone hecogenin to the hecogenin azine according to procedure (a) above; it may alternately be evaporated to dryness and heated according to procedure (b) to convert to the azine; or the alkanolic hydrazone solution may be refluxed with pyridine hydrochloride to effect the conversion to the azine according to procedure (c) or be refluxed in high boiling solvents according to procedure (d). The azine is recovered as crystals from the alcoholic solution by concentrating and cooling. The azine may, of course, be further purified by washing it with members selected from the classes of lower aliphatic ethers and esters, preferably ethyl acetate, amyl acetate, n-butyl ether, dioxane. The azine may be converted to hecogenin by refluxing at a pH of about 1 in a mixed solvent such as ethanol and chloroform. Neutralization and concentration results in crystallization of hecogenin.

In a further modification, applicable where the hydrazone derivative of hecogenin is hecogenin substituted with hydrazine (R=H), the conversion of oily liquid hydrazone hecogenin to crystallizable solid azine may be accomplished by a condensation with a carbonyl compound of the formula R'=O where R' is as above defined. The ketone or aldehyde condenses according to the equation set forth above with the primary amine radical to form an azine of Formula II, 12-(R'=N—N=)hecogenin. The lower ketones ($C_3$—$C_6$) like acetone, methyl ethyl ketone, di-ethyl ketone, methyl propyl ketone, ethyl butyl ketone and the like, may be used. These azines are solids crystallizable from similar polar solvents (i.e. the alkanols) and form a suitable modified type of solid hydrazones readily purified by crystallization. The advantage of using a compound of this type in the present separation method is that in the instance of the unsubstituted oily hydrazone hecogenin Formula I (R=H), reaction thereof with a lower ketone comprises as very easy conversion of the oily hydrazone compound to a crystallizable solid azine. The lower ketone azine derivative of hecogenin is readily hydrolized to free pure hecogenin in the same manner as for the hydrazones or the hecogenin azine.

The extractions in the examples given below were performed upon dry acid hydrolizate of Mexican *Agave fourcroydes*. Other plant species from which sapogenin materials comprising a mixture of both oxo and non oxo-sapogenins are available by hydrolysis may be used as the starting material mixture; these, depending upon the specific plant material, will vary from one to another in the quantity of hecogenin with respect to other sapogenins, but the procedure for resolving such mixtures as set forth herein, may be used.

The following examples illustrate the practice of this invention:

*Example Ia.*—Two grams of sapogenin mixture is dissolved in 20 ml. of ethyl alcohol; 4 ml. of hydrazine hydrate is added and reaction carried to completion by heating under reflux for 24 hours. The length of time required for completion will vary in different localities with boiling point of the alcohol and with the specific mixture, but may be determined conveniently by testing for the disappearance of the carbonyl band from the infra-red absorption curve of a sample. When the reaction is complete, 12 ml. of solvent are distilled off at atmospheric pressure. The distilland is then chilled, preferably at 0° C. for two hours. 0.5 gram of crystalline material were thus produced which is filtered and washed with a small volume of previously chilled alcohol. Crystals are tigogenin and have the following constants: M.P.=194–198° C. $[\alpha]_D = -47.5$ ($CHCl_3$). Sapogenin material obtained from Mexican *Agave fourcroydes* usually contains about 0.6–0.8 gram of tigogenin.

*Example Ib.*—The filtrate containing hecogenin hydrazine derivative (Formula I; R is H), is adjusted, preferably with hydrochloric acid to substantial acidity, pH 1.0, and refluxed for about 30 minutes. The mixture is then neutralized to pH 7 with strong aqueous sodium hydroxide and the solvent partially removed by distillation carried out at atmospheric pressure until abundant crystal formation is observed. The mixture is then cooled to room temperature and filtered. The crystals are washed with cold alcohol, followed by copious washing with water. The hecogenin crystals so obtained weigh between 0.9 and 0.96 gram; melting point of 240–245° C.;

$$[\alpha]_D = \pm 0 \ (CHCl_3)$$

Concentration and crystallization of the mother liquors gives a sapogenin mixture which is returned to the process for recovery. This same procedure carried out by substitution of ethyl hydrazine hydrate and thio semi carbazine form, respectively, 12-ethylhydrazone hecogenin (Formula I; R is ethyl) and 12-thio semicarbazine hecogenin

(Formula I; R is $NH_2\overset{S}{\underset{\|}{C}}$)

*Example IIa.*—10 grams of sapogenin mixture is milled to pass a 20 mesh screen and is added to 50 ml. of ethyl alcohol. 10 ml. of hydrazine hydrate is added and mixture is refluxed for 24 hours. 15 mls. of water are then slowly added, while stirring, and the mixture then cooled to 20° C. The tigogenin crystals are then filtered, washed with 5 ml. of diluted ethyl alcohol (density 0.87 at 22° C.) and with water. Yield: 4 grams, M.P.=190–200° C., $[\alpha]_D = -47.5 \ (CHCl_3)$.

*Example IIb.*—The alkaline alcohol filtrate containing 12-hydrazone hecogenin (Formula I; R=H) is adjusted to pH 6.0 with hydrochloric acid and refluxed for 15 minutes. The hecogenin azine (Formula II; R' is hecogenin) crystals so obtained are filtered and washed with hot water. The product may be converted to hecogenin following procedure set forth in Example VI.

*Example III.*—5 grams of the sapogenin mixture is refluxed for 12 hours with a mixture of 25 mls. ethylene glycol monoethyl ether and 5 mls. hydrazine hydrate. 0.05 gram of activated carbon and 0.5 gram of diatomaceous earth are then added and the mixture filtered. The solution is chilled to 0° C. and the tigogenin crystals are filtered off, washed with a small quantity of cold ethylene glycol monoethyl ether and dried. Yield: 2 grams, M.P.=195–200° C., $[\alpha]_D = -55° \ (CHCl_3)$.

*Example IV.*—The filtrate of Example III is distilled to dryness under vacuum giving rise to 3.1 grams of an oily residue. Chromatography of this material over Florisil gives a colorless oil, which, when completely dried, is a resinous material with a melting point of 90–150° C., $[\alpha]_D = -40° \ (CHCl_3)$.

Prolonged heating at 210° C. transforms the hydrazone derivative (Formula I; R is H) of Example IV to the azine (Formula II; R'=hecogenin) as does also the adjustment to pH 6.0 detailed in Example IIb. The third procedure to effect this conversion is illustrated in Example V.

*Example V.*—3 grams of the resinous material obtained in Example IV are refluxed for 30 minutes with 10 mls. of ethyl alcohol and 0.3 gram of pyridine hydrochloride. 2.5 grams of a crystalline solid precipitates out of the solution which is filtered from the hot mixture and washed with hot ethyl acetate to eliminate traces of tigogenin and other sapogenins. This azine corresponds to Formula II and has a melting point of 329–331° C. $[\alpha]_D = +61°$. ($CHCl_3$). Infra-red adsorption band 1619 cm.$^{-1}$. Calculated for $C_{54}H_{84}O_6N_2$: N, 3.26; found, 3.19.

*Example VI.*—To obtain hecogenin from the azine, 2 grams of hecogenin azine obtained by the method of Examples II, IV, or V, are refluxed for 30 minutes with 10 mls. of ethyl alcohol, 10 mls. $CHCl_3$, 2 mls. water and 2 mls. concentrated hydrochloric acid. 0.8 gram of sodium hydroxide dissolved in 2 mls. water are then added and distillation is carried out until abundant crystallization has occurred. The suspension is filtered, the crystals are washed with hot water and dried to obtain 1.6 grams of a product having a melting point of 245–250° C., $[\alpha]_D = 0 \ (CHCl_3)$.

*Example VII.*—Example Ia is repeated. The filtrate is dried in vacuo and recrystallized three times from ethyl acetate-hexane to give .9 gram of crystals having a M.P. of 205–207° C. $[\alpha]_D -28° \ (CHCl_3)$ (Formula I) calculated for $C_{27}H_{44}O_3N_2$: N=6.3; found, 6.56. The hydrazone hecogenin compound when first formed is an oily liquid. It sets to resinous body on drying as in Example IV and may ultimately be purified to solid crystalline form of this example. The absence of carbonyl and the quantity of nitrogen calculated for and found, establishes Formula I.

*Example VIII.*—2 grams of sapogenin mixture is refluxed with 5 grams of thiosemicarbazide in 20 ml. of ethyl alcohol for 20 hours. 10 ml. of solvent is then distilled off, the residue chilled to 0° C. and tigogenin was removed by filtration and purified as in Example I. The filtrate was adjusted to pH 1 with HCl and refluxed for 30 minutes. It was neutralized to pH 7 with aqueous NaOH, concentrated by distillation until crystals appeared, cooled and the crystals were filtered and washed. The yield was 0.8 gram of hecogenin M.P. 240–245° C. $[\alpha]_D \pm 0 \ (CHCl_3)$.

*Example IX.*—10 grams of the oily hydrazone hecogenin compound (Formula I, R=H) described in Example IV are refluxed with 10 ml. acetone for 60 minutes. The mixture is cooled to 0–5° C. and the crystals filtered. 9.3 grams of acetone hecogenin azine (Formula II, R'=C(CH$_3$)$_2$), M.P. 202–205° C., which after recrystallization from chloroform-acetone gives M.P. 206–208° C. Calculated for $C_{30}H_{48}O_3N_2$: C, 74.3%; H, 5.79%; N, 5.79%. Found: C, 74.51%; H, 9.75%; N, 5.79%.

Following the procedure of this example, but substituting methyl ethyl ketone, di ethyl ketone, and methyl propyl ketone for the acetone, there is respectively obtained 12-methyl ethyl azine hecogenin, 12-di ethyl azine hecogenin and 12-methyl propyl azine hecogenin (Formula II).

*Example X.*—Following the procedure of Example VI the hecogenin keto azine is hydrolyzed at pH 1 with HCl to hecogenin.

*Example XI.*—2 grams of sapogenin mixture is dissolved in 20 ml. of ethyl alcohol together with 4 ml. of hydrazine hydrate and refluxed for 24 hours. The excess hydrazine is recovered for re-use by concentration of the reaction mixture to dryness. The mixed dry residue obtained in the initial reaction for the hydrazone derivative of the hecogenin is refluxed in 10 ml. of ethyl alcohol and filtered from the insoluble residue of non-oxo-sapogenins. The non oxo-sapogenin solid filter cake is dissolved in 10 ml. of ethyl acetate and concentrated to 7 ml. volume, chilled to 0° C. and allowed to stand for 24 hours. The crystals were tigogenin. The hecogenin hydrazone solution is then adjusted to a pH of 6 and heated under reflux for 15 minutes, concentrated to a volume of 6 ml., chilled to 0° and crystals of hecogenin azine are filtered, washed and dried.

This application is a continuation-in-part of S.N. 620,176 filed November 5, 1956, now abandoned.

What is claimed is:

1. The process for separating hecogenin from a mixture thereof with sapogenins lacking an oxo group which comprises heating the mixture in a lower alkanol solution with hydrazine until the hecogenin has been converted to the hydrazone of hecogenin and concentrating the solution until the unreacted sapogenins precipitate.

2. The process for separating the hecogenin from a mixture thereof with sapogenins lacking an oxo group which comprises heating the mixture in a lower alkanol solution with hydrazine until the hecogenin has been converted to the hydrazone of hecogenin and adding water to precipitate the unreacted sapogenins.

(References on following page)

References Cited in the file of this patent

UNITED STATES PATENTS

| | | |
|---|---|---|
| 2,306,635 | Marker | Dec. 29, 1942 |
| 2,408,835 | Wagner | Oct. 8, 1946 |
| 2,695,287 | Wendler et al. | Nov. 23, 1954 |

OTHER REFERENCES

Fieser and Fieser: "Natural Products Related to Phenanthrene," 3rd edition (1949), pages 308–9.

"J.A.C.S.," vol. 74 (1952), article by Cohen et al., page 3938 relied on.